(12) United States Patent
Alic

(10) Patent No.: US 9,154,346 B2
(45) Date of Patent: Oct. 6, 2015

(54) METHOD FOR REDUCING EQUALIZER COMPLEXITY IN COMMUNICATION LINKS

(71) Applicant: Nikola Alic, La Jolla, CA (US)

(72) Inventor: Nikola Alic, La Jolla, CA (US)

( * ) Notice: Subject to any disclaimer, the term of this patent is extended or adjusted under 35 U.S.C. 154(b) by 0 days.

(21) Appl. No.: 14/204,761

(22) Filed: Mar. 11, 2014

(65) Prior Publication Data

US 2014/0269885 A1  Sep. 18, 2014

Related U.S. Application Data

(60) Provisional application No. 61/778,437, filed on Mar. 13, 2013.

(51) Int. Cl.
  *H03H 7/30* (2006.01)
  *H03K 5/159* (2006.01)
  *H04L 27/00* (2006.01)
  *H04L 27/01* (2006.01)

(52) U.S. Cl.
  CPC ..................... *H04L 27/01* (2013.01)

(58) Field of Classification Search
  CPC .......... H04B 1/10–1/14; H04B 1/1027–1/126; H04L 25/08; H04L 5/0007; H04L 5/0048; H04L 25/0204; H04L 25/0232; H04L 25/025; H04L 25/03012

USPC ......................................... 375/229, 230–236
See application file for complete search history.

(56) References Cited

U.S. PATENT DOCUMENTS

| 6,574,268 | B1 * | 6/2003 | Bergamo ...................... 375/142 |
| 6,631,175 | B2 | 10/2003 | Harikumar et al. |
| 7,184,471 | B2 | 2/2007 | Peeters |
| 7,639,738 | B2 * | 12/2009 | Lopez de Victoria ......... 375/232 |
| 8,155,130 | B2 | 4/2012 | McGrew et al. |
| 8,249,129 | B2 | 8/2012 | Fudge |
| 8,363,704 | B1 | 1/2013 | Rayburn |
| 8,582,636 | B2 * | 11/2013 | Allpress et al. ............... 375/233 |
| 2010/0040156 | A1 * | 2/2010 | Patel et al. .................... 375/260 |

FOREIGN PATENT DOCUMENTS

WO  9952250 A1  10/1999

* cited by examiner

*Primary Examiner* — Qutbuddin Ghulamali
(74) *Attorney, Agent, or Firm* — Ditthavong & Steiner, P.C.

(57) ABSTRACT

The present invention relates to a method of reducing equalizer complexity in communication systems, which also provides for reduced power dissipation. The method consists of reducing the number of channel responses expected by the equalizer by averaging sub-groups of all of the possible the channel responses chosen in a particular way.

24 Claims, 5 Drawing Sheets

| Bit combination | System response [a.u] |
|---|---|
| 0 0 0 | 0.0 |
| 0 0 1 | 0.25 |
| 0 1 0 | 0.5 |
| 0 1 1 | 0.75 |
| 1 0 0 | 1.0 |
| 1 0 1 | 1.25 |
| 1 1 0 | 1.5 |
| 1 1 1 | 1.75 |

→ 0.375 average

→ 1.375 average

Fig. 3

| Bit combination | System response [a.u] |
|---|---|
| 0 0 1 0 1 0 0 | 1.0 |
| 0 0 1 0 1 0 1 | 1.1 |
| 0 0 1 0 1 1 0 | 1.25 |
| 0 0 1 0 1 1 1 | 1.35 |
| 0 1 1 0 1 0 0 | 1.25 |
| 0 1 1 0 1 0 1 | 1.35 |
| 0 1 1 0 1 1 0 | 1.5 |
| 0 1 1 0 1 1 1 | 1.6 |
| 1 0 1 0 1 0 0 | 1.1 |
| 1 0 1 0 1 0 1 | 1.2 |
| 1 0 1 0 1 1 0 | 1.35 |
| 1 0 1 0 1 1 1 | 1.45 |
| 1 1 1 0 1 0 0 | 1.35 |
| 1 1 1 0 1 0 1 | 1.45 |
| 1 1 1 0 1 1 0 | 1.6 |
| 1 1 1 0 1 1 1 | 1.7 | average ⟶ 1.35

Fig. 5

METHOD FOR REDUCING EQUALIZER COMPLEXITY IN COMMUNICATION LINKS

CROSS-REFERENCES TO RELATED APPLICATION

The present application claims the benefit of U.S. Provisional Application Ser. No. 61/778,437 by Nikola Alic, filed on Mar. 11, 2013, and entitled "A Method for Reducing Equalizer Complexity in Communication Links," the contents of which are incorporated herein in their entirety by this reference.

FIELD OF THE INVENTION

The present invention relates generally to communication systems and more particularly to reducing the complexity of the equalization structure used in communication systems. The method is of particular interest for bandwidth constrained, or narrowly filtered communication systems.

BACKGROUND OF THE INVENTION

Bandwidth constrained or narrowly filtered communication systems are described in U.S. Pat. No. 8,155,530 to Alic, incorporated herein by this reference.

Communication systems, and in particular those relying on bandwidth constrained equalized transport principles need to incorporate equalizers in order to mitigate either deterministic and stationary, or time varying channel impairments in order to attain a desired level of performance. As a matter of fact, the complexity of the equalizer is directly related to the length of the channel response to a single input symbol (sometimes referred to as the channel spread), resulting from the impairments. In consequence, an extended channel response may result in undesirably and even prohibitively complex solutions fail to meet the industry needs since they result in overly intricate, and, thus, highly power hungry outcomes. Currently there are a number of solutions for equalization in communication systems affected by intersymbol interference. Some of these solutions attempt to mitigate channel induced impairments acting on the known (or estimated) channel spread. However, these solutions fail to meet the needs of the industry because they transform into complex equalization structures for a given amount of intersymbol interference length. Consequences of the underlying high complexity are an increased power dissipation of the equalizer and the communication system as a whole, increased latency, and challenging implementation. Other solutions attempt to use less complex equalization structures. However, these solutions are similarly unable to meet the needs of the industry because of the inappropriate performance associated with the latter equalizers.

Low complexity equalization is a critical practical concern in communication systems realization. The said property translates to lower receiver and system overall power dissipation, lower latency and complexity. Consequently, there currently exists a clear need in the industry for a reduced complexity equalizers, in particular related to bandwidth constrained equalized transport systems. It would, thus, be desirable to have a composition (i.e. an equalizer) that is capable of providing a superior mitigation of the intersymbol interference, and, thus, performance of communication systems, while maintaining a lower complexity, and low power dissipation which/that can be used to both user and system-provider benefit. Furthermore, it would also be desirable to have a composition that operates with low latency. Still further, it would be desirable to have a compound with good performance and a low complexity. Therefore, there currently exists a need in the industry for a composition that performs adequate equalization of the channel response, while maintaining low complexity of the underlying equalizer structure.

SUMMARY OF THE INVENTION

The present invention advantageously fills the aforementioned deficiencies by relying on a lower complexity equalization structure, without a significant compromise on the system performance.

The present invention is a method for complexity reduction of equalizers in communication systems, which consists of the following steps: (1) a full length channel response acquisition, i.e. for symbol patterns equal in length (or longer) to the length of the channel spread; (2) reducing the set of channel responses by (possibly weighted) averaging the subsets of responses chosen in a particular way; namely, the channel responses are divided into subgroups, based on the underlying symbol patterns they correspond to; (3) using the thus obtained reduced set of responses as a model channel response for lower complexity equalization. Steps (1) and (2) can be repeated periodically in time varying channels.

The present invention method is unique when compared with other known processes and solutions in that it: (1) leads to up to exponential reduction in complexity of the equalizer; (2) allows more than an order of magnitude reduction in power dissipation; and (3) enables reduction of latency.

The present invention is unique in that it is different from other known processes or solutions. More specifically, the present invention owes its uniqueness to the fact that it: (1) reduces the effective channel response length that needs to be equalized for in a particular original way; and (2) enables successful system operation based on lower complexity equalization.

Among other things, it is an object of the present invention to provide a reduced complexity equalization structure that does not suffer from any of the problems or deficiencies associated with prior solutions.

It is still further an object of the present invention provide a lower power dissipating equalization structure.

Further still, it is an object of the present invention to provide a lower latency and simpler practical implementation of the receiving end of the communication system.

BRIEF DESCRIPTION OF THE DRAWINGS

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

FIG. 3 shows model channel response compaction from 3 symbols to 1 for a single sided channel spread example.

FIG. 5 shows model channel response compaction from 7 symbols to 3 for a symmetric double sided channel spread example.

DETAILED DESCRIPTION OF THE INVENTION

Figure 1:
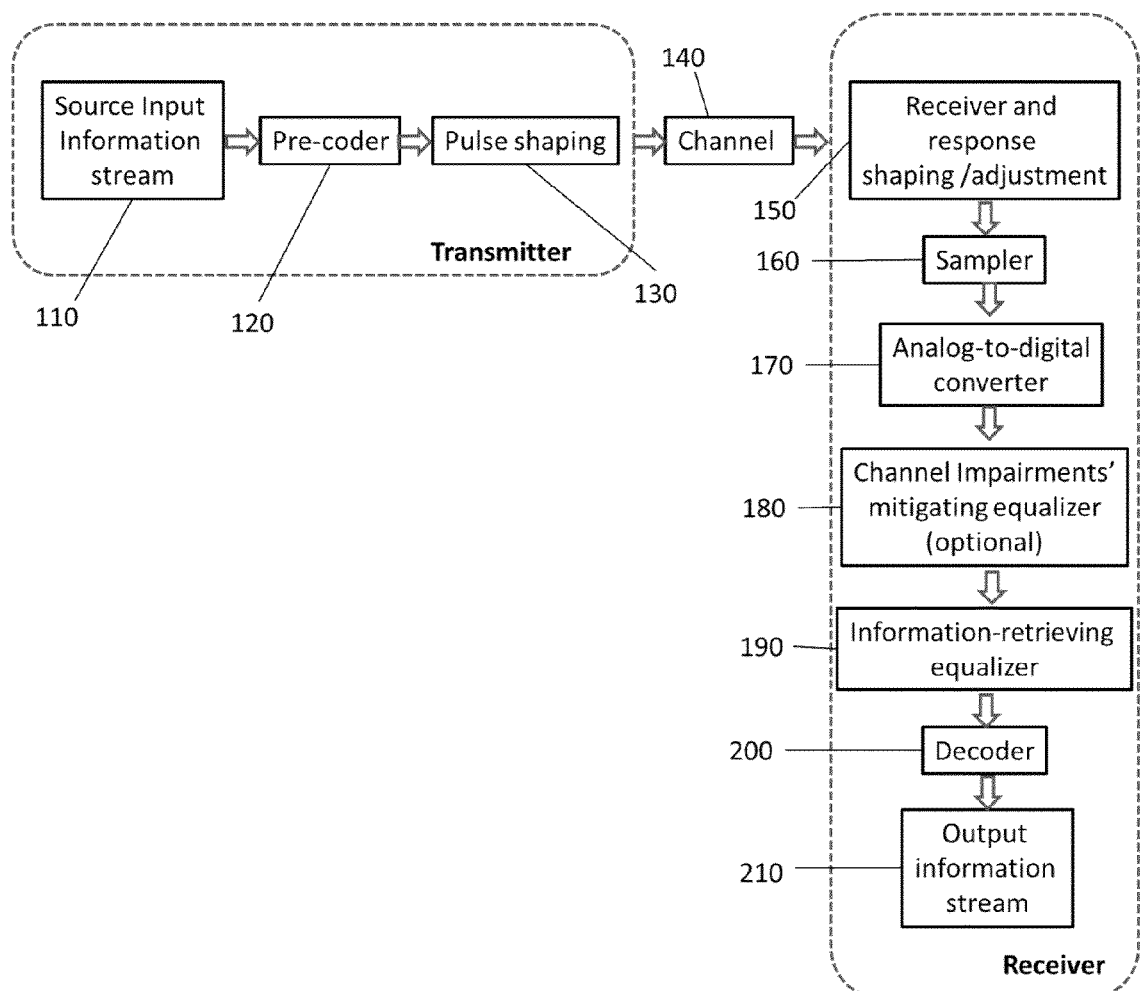
FIG. 1 shows a general communication system schematic.

The present invention is directed to reduction of equalizer complexity in communication systems with intersymbol interference and in particular to bandwidth constrained equalized transport (BCET) systems.

In the preferred embodiment of the invention, assuming the bandwidth constraint causes a spread of a single input symbol to L symbol slots (L being an integer number), as an example, for an M-symbol alphabet communication system input, the total number of output responses (not necessarily all distinct) will be M raised to the power of L ($M^L$), and the total channel response length equalizer will have to operate on the total memory length of the channel in terms of the number of symbol slots (i.e. L), whereas the equalizer complexity is related to that memory length and can range from a linear to e.g. exponential dependence on the length of the channel spread.

The receiving equalizers for small fractional bandwidth constraint systems are often, but not exclusively, realized based on trellis structures, performing the information retrieval operation by some embodiment of dynamic programming, or Viterbi algorithm, calculating and accumulating likelihoods of the received sequence of responses, comparing them to a set of known and/or expected system (often referred to as model) responses (of size $M^L$). The present invention teaches that a reduced complexity equalizer either of a trellis structure, or of a different embodiment (i.e. that corresponding to the channel response of reduced length K, where K is an integer number) can be constructed for a response shorter than the total channel spread length L (thus, for a K that is less than L) in the following manner. A (shortened) channel model response corresponding to a given particular symbol combination of length K is obtained as a (possibly weighted) average of the M to the power of (L−K) (i.e. $M^{(L-K)}$) responses corresponding to the symbol patterns that are augmentation of the shortened pattern, i.e. from length K to length L. An example of the method is shown in FIG. 5 in which shortening from 7 (L=7) symbols to 3 (K=3) symbols is illustrated, according to the present invention. The shortened pattern is assumed to be a '101' combination (in this particular example). The channel spread is assumed to be two-sided and symmetric and the symbol alphabet is assumed to be binary. Commencing from a pattern of length 3 (i.e. '101' pattern in this example), and augmenting it to a length of 7 for a symmetric two-sided channel spread, there are $2^4$ (i.e. patterns whose middle 3 symbols are '101') such equivalent patterns possible in total. All of these patterns are shown in FIG. 5, along with the corresponding responses for the full length channel spread. Finally, the reduced length channel response for the particular bit-combination '101' is obtained as the mean value of all entries in the table shown in FIG. 5. For a complete compaction of the equalizer responses from a length of 7 symbols to a length of 3 symbols, the shortening process is repeated for all of the eight shortened bit patterns of length three. Ultimately, at the conclusion of these steps, a shortened set of model channel responses amenable to a lower complexity equalizer is arrived at. The reduced complexity equalizer obtained in the described manner performs comparably to the original—full length equalizer, however, with a lower power dissipation and complexity, as compared to the full length/full complexity equalizer. Consequently, the whole process of equalizer structure simplification is based on the reduction of model channel responses number by a specific grouping of all possible full-length channel responses, whereas each of the sub-groups is subsequently represented by a single response, corresponding to a (possibly weighted) average of all responses in the particular sub-group. The division into the sub-groups is performed with respect to the symbol patterns producing the channel responses. Three specific, but in no way exclusive, or unique examples of the averaging of equivalent responses (or the said compaction) are shown in FIGS. 3-5.

Another exemplary embodiment of the invention is shown in FIG. 3, for a system with a 'preceding single-sided' memory response (see FIG. 2 for an illustration of a channel with memory with a preceding single-sided response) and a compaction from a 3-bit channel response, to a 1-bit channel response. In the exemplary system under consideration in FIG. 3, each symbol input to the system produces response spreading over three symbol slots, with the first symbol on the left hand side of the 3-symbol pattern representing the leading (i.e. main) part of the pattern (shown in a shaded rectangle in FIG. 3). The remaining 2 symbols in the pattern (i.e. other than the leading symbol) are referred to as the trailing symbols. In the table in FIG. 3, all 8 possible binary patterns are shown (as combination of 3 bits each of which allowed one of the two possible digits/symbols '0', or '1'). In consequence, for a compaction of the described channel from 3 symbols to one symbol, two outcomes of the channel response compaction are possible—the '0', and the '1'. The outcome of channel shortening for each of the compacted channel responses is obtained as the average of the responses corresponding to the patterns in the table in FIG. 3 whose main (i.e. leading) part is a '0', or a '1', respectively.

Figure 4:
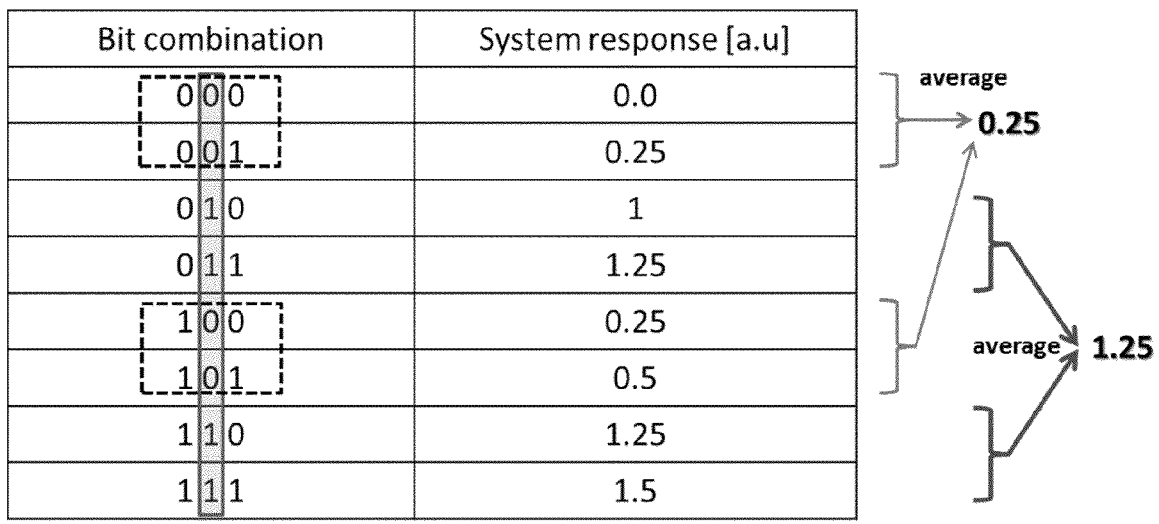
FIG. 4 shows model channel response compaction from 3 symbols to 1 for a two sided channel spread example.

Another exemplary embodiment of the invention is shown in FIG. 4, for a system with double-sided memory response. In the system with memory under consideration, each symbol input to the system produces response spreading over three symbol slots, with the middle symbol of the 3-symbol pattern representing the main part of the pattern (shown in a shaded rectangle in FIG. 4), with the remaining 2 symbols considered as the trailing symbols and, thus, a compaction from 3 symbols to 1 symbols is demonstrated. In the table in FIG. 4 all 8 possible 3-symbol binary patterns are shown. As far as the compaction under consideration, two outcomes of compaction are possible—a '0', and a '1'. According to the representation in FIG. 4, the two possible shortened channel responses are obtained as the average of the responses corresponding to the patterns in the table in FIG. 3 whose main part is a '0', or a '1', respectively.

In practice, channel outputs passed to the information retrieving equalizer are obtained from an analog-to-digital converter whose construction or operation may, or may not affect the values of the actual channel responses, or their statistics. The effect of the ADC is readily included in the operation of the invention. In another instance of the embodiment, the reduced complexity information retrieving equalizer can be designed to output hard, or soft information, or both, on the retrieved symbol information content that is passed to the error control decoder, optionally following the information retrieving equalizer. The present invention is applicable to any embodiment in which the communication system includes error control, constrained, and/or source encoding and decoding, or a combination thereof. In the preferred embodiment the invention is applicable to wireless communications. Moreover, the invention is applicable to any form of communications relying on constrained bandwidth principles, irrespective of the transmission medium, or the carrier of information, such as, but not limited to: optical communications, fiber-optic communications, satellite communications, submarine communications, as well as storage applications.

The present invention may also be implemented in one of the following, but not exclusively limited to, alternative realizations: In one embodiment, the present invention can be used for shortening of the response by 1 symbol slot. Alternatively, it can be used for shortening of the response by more than one symbol slot. In another instance, the invention is applicable to asymmetric channel spreads, whereas the asymmetries analogous to that of the channel spread assumed to the consideration of the leading (main) and trailing parts of symbol patterns, and obvious to those skilled in the art. As a further example, the invention is applicable to single sided resulting spreads, with an appropriate—i.e. single sided, definition of the leading and trailing parts of symbol patterns. In another embodiment the same effect in equalization structure reduction can be achieved by a proper weighted averaging of the equivalent responses. As a further embodiment, the described approach is also applicable to the complexity reduction for equalization of the channel spread caused by impairments beyond control of a system designer either within, or out of the scope of bandwidth constrained communication systems.

Referring to the figures, FIG. 1 shows a general communication system block diagram. In general, a communication system comprises of a transmitter, channel and a receiver blocks. Within the transmitter, the following parts are discernible: Input information stream (110), a pre-coder (120), as well as the pulse-shaping block (130), responsible for shaping of the information—bearing waveforms transmitted through the channel. The receiver, on the other hand, comprises: a receiving filter (150), a sampler (160), an analog-to-digital converter (170), a channel impairments' mitigating equalizer (180), an information—retrieving equalizer (190) whose operation the present invention is primarily concerned with, a decoder (200), concluding with an output information stream (210).

Figure 2:
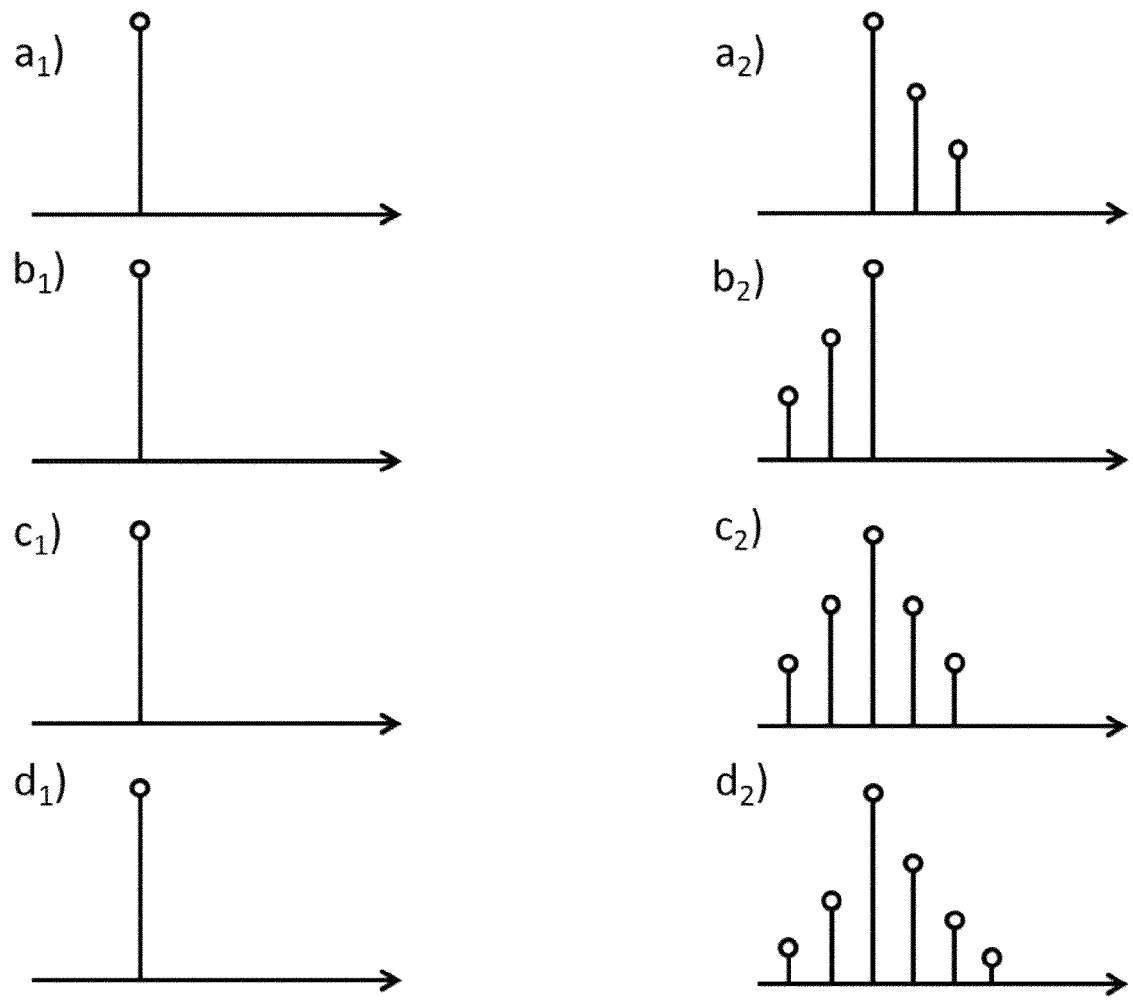
FIG. 2 shows exemplary channel spread responses.

FIG. 2 shows an illustration of four possible channels spreads: (a) single-sided spread with intersymbol interference affecting symbols following the leading symbol; (b) single-sided with intersymbol interference affecting the symbols preceding the leading symbol; (c) a two-sided symmetric channel spread; and (d) two sided asymmetric channel spread.

FIG. 3 shows a channel response compaction from 3 symbols to 1 for a single sided channel spread example, whereas the compacted response (for the bit in the shaded region in FIG. 3) is obtained by averaging the equivalent responses within the two groups of responses, i.e. those corresponding to a '0', and '1', shown in the shaded slot.

FIG. 4 shows a channel response compaction from 3 symbols to 1 for a double sided symmetric channel spread example, with, again, two possible compaction groups.

FIG. 5 shows a channel response compaction from 7 symbols to 3 for a double sided channel spread example, for one particular (i.e. '101') shortened symbol combination.

In general, a method for complexity reduction of an equalizer in a communication system comprises the steps of:

(1) generating a full-length channel response acquisition for symbol patterns equal in length to or longer than the length of the channel spread;

(2) reducing the set of channel responses by averaging the subsets of responses; and (3) using the reduced set of responses of step (b) as a model channel response for lower complexity equalization.

While the present invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The following patents and patent application publications are cited. These patents and patent application publications are not necessarily prior art: U.S. Pat. No. 7,639,738 Lopez; U.S. Pat. No. 8,582,636 Allpress; U.S. Pat. No. 7,184,471 Peeters; U.S. Pat. No. 8,363,704 Rayburn; U.S. Pat. No. 6,631,175 Harikumar; U.S. Pat. No. 8,249,129 Fudge; and EP 1068704 Leske.

Advantages of the Invention

The present invention provides a method for reducing complexity in equalizers so that such equalizers can rely on a lower complexity equalization structure without a significant compromise of performance. This enables a reduction of latency and a significant reduction in power dissipation.

The present invention possesses industrial applicability as a method for reducing complexity in equalizers.

The method claims of the present invention provide specific method steps that are more than general applications of laws of nature and require that those practicing the method steps employ steps other than those conventionally known in the art, in addition to the specific applications of laws of nature recited or implied in the claims, and thus confine the scope of the claims to the specific applications recited therein. The method steps require the use of specific hardware and involve specific processes involving the hardware that generate a change in physical state of the hardware.

The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein.

It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. The disclosures of all articles and references, including patent publications, are incorporated herein by reference.

What is claimed is:

1. A method for complexity reduction of an equalizer in a communication system comprising the steps of:
    (a) generating a full-length channel response acquisition for symbol patterns equal in length to, or longer than the length of a channel spread;
    (b) reducing an effective set of channel responses by averaging subsets of appropriate responses;
    (c) using the reduced set of responses of step (b) as a model channel response for lower complexity equalization; and
    wherein the reduced complexity equalizer is based on the reduction of model channel responses number by a specific grouping of all possible full-length channel responses, whereas each sub-group is subsequently represented by a single response, corresponding to an optionally weighted average of all responses in a particular sub-group, wherein the division into the sub-groups is performed with respect to the symbol patterns producing the channel responses.

2. The method of claim 1 wherein the averaging step of step (b) results in a weighted average.

3. The method of claim 1 wherein steps (a) and (b) are repeated periodically in time varying channels.

4. The method of claim 1 wherein the method leads to up to exponential reduction in complexity of the equalizer.

5. The method of claim 1 wherein the method results in more than an order of magnitude in power dissipation.

6. The method of claim 1 wherein the method enables reduction of latency.

7. The method of claim 1 wherein the equalizer complexity is linearly related to channel spread.

8. The method of claim 1 wherein the equalizer complexity is exponentially related to channel spread.

9. The method of claim 1 wherein the reduced complexity equalizer is of a trellis structure.

10. The method of claim 1 wherein the reduced complexity equalizer is constructed for a response shorter than the total spread length.

11. The method of claim 1 wherein the equalizer is constructed to process a preceding single-sided memory response and employs a compaction from a 3-symbol channel spread response to a 1-symbol channel response.

12. The method of claim 1 wherein the equalizer is constructed to process a double-sided memory response such that each symbol input to the system produces a response spreading over three symbol slots with a middle symbol of the resulting three-symbol pattern representing the main part of the pattern.

13. The method of claim 1 wherein the equalizer is constructed to process a double-sided memory response such that each symbol input to the system produces a response spreading over seven symbol slots with a middle symbol of a resulting three-symbol pattern representing a main part of the pattern.

14. The method of claim 1 wherein channel outputs passed to the equalizer are obtained from an analog-to-digital converter.

15. The method of claim 1 wherein the equalizer is constructed to output hard information, soft information, or both.

16. The method of claim 1 wherein the equalizer is part of a communication system including error control, constrained and/or source encoding and decoding, or a combination thereof.

17. The method of claim 1 wherein the equalizer is adapted to function in a wireless communication system.

18. The method of claim 17 wherein the communication system is selected from the group consisting of an optical communication system, a satellite communication system, a fiber-optic communication system, and a submarine communication system.

19. The method of claim 1 wherein the equalizer is adapted to function in a communication system relying on constrained bandwidth principles.

20. The method of claim 1 wherein the method shortens the response by one symbol slot.

21. The method of claim 1 wherein the method shortens the response by more than one symbol slot.

22. The method of claim 1 wherein the method employs an asymmetric channel spread.

23. The method of claim 1 wherein the method employs a single-sided channel spread.

24. The method of claim 1 wherein the method of channel response shortening takes into account a higher order statistics, including, but not limited to variance, and/or covariance matrices of the full length channel responses.

* * * * *